United States Patent [19]

Komatsu

[11] Patent Number: 4,802,728
[45] Date of Patent: Feb. 7, 1989

[54] PIN PLUG WITH AN OPTICAL FIBER

[75] Inventor: Yasuhiro Komatsu, Osaka, Japan

[73] Assignee: Hosiden Electronics Co., Ltd., Osaka, Japan

[21] Appl. No.: 153,381

[22] Filed: Feb. 8, 1988

[30] Foreign Application Priority Data

Feb. 12, 1987 [JP] Japan .................................. 62-19482

[51] Int. Cl.$^4$ ................................................ G02B 6/36
[52] U.S. Cl. ................................ 350/96.20; 350/96.21
[58] Field of Search ............... 350/96.20, 96.21, 96.22

[56] References Cited

U.S. PATENT DOCUMENTS

| 4,319,802 | 3/1982 | Bowes | 350/96.20 |
| 4,355,862 | 10/1982 | Kock | 350/96.20 |
| 4,368,948 | 1/1983 | Despuoys | 350/96.20 |
| 4,477,146 | 10/1984 | Bowen et al. | 350/96.21 |
| 4,696,537 | 9/1987 | Bauer et al. | 350/96.20 |

FOREIGN PATENT DOCUMENTS

| 55-106410 | 8/1980 | Japan | 350/96.20 |
| 57-99605 | 6/1982 | Japan | 350/96.20 |
| 58-195813 | 11/1983 | Japan | 350/96.20 |

Primary Examiner—William L. Sikes
Assistant Examiner—Frank González
Attorney, Agent, or Firm—Pollock, Vande Sande & Priddy

[57] ABSTRACT

A plug body has, on its front, a cylindrical portion integrally molded therewith and a ferrule is disposed in the cylindrical portion along its axis. The front end portion of the ferrule projects out of the cylindrical portion and the rear end portion is inserted in the plug body. An optical fiber exposed at the front end of an optical fiber cable is fitted in the front end portion of the ferrule and the rear end portion of the optical fiber cable is led out from the back of the plug body.

3 Claims, 2 Drawing Sheets

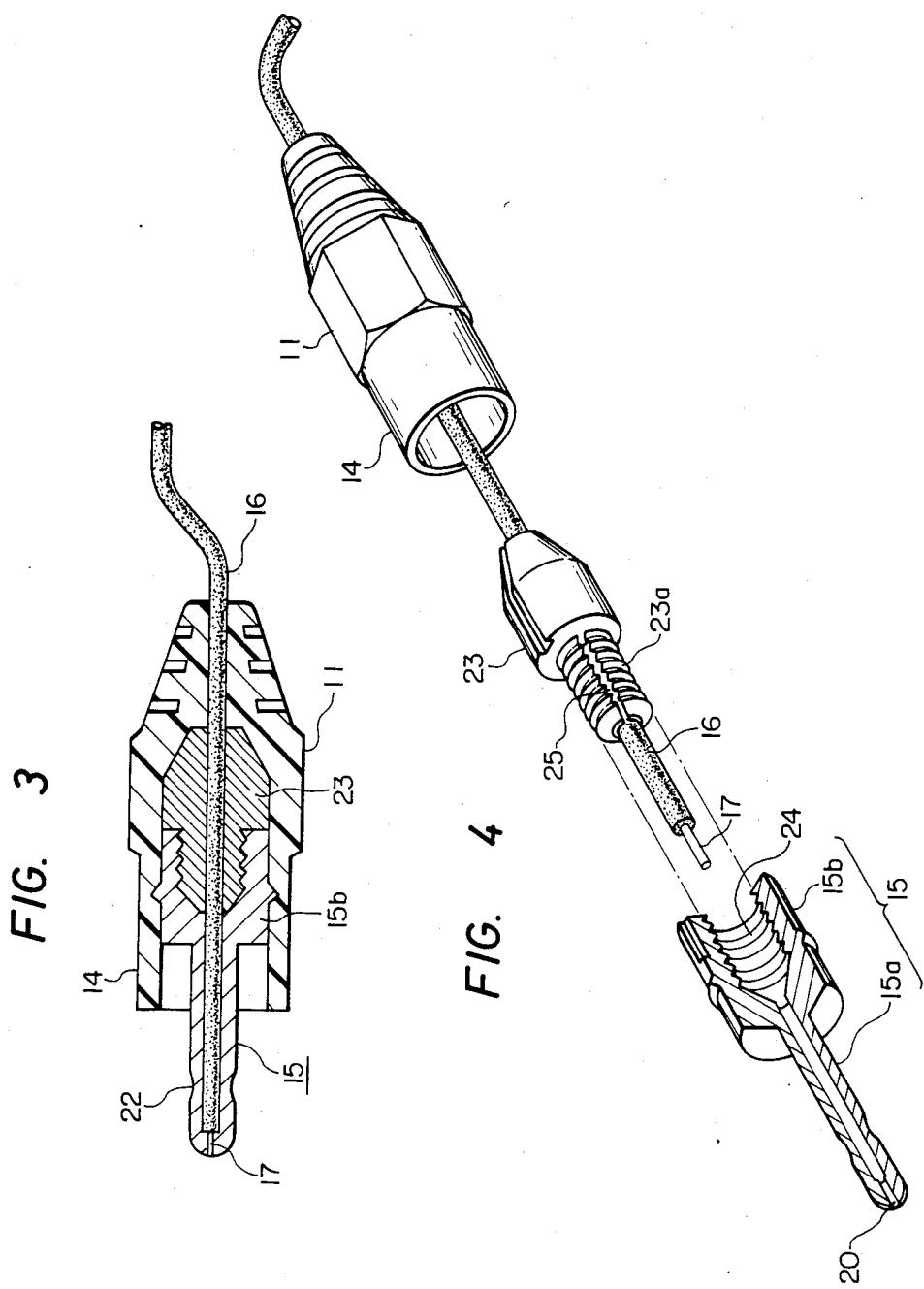

PIN PLUG WITH AN OPTICAL FIBER

CROSS REFERENCE TO RELATED APPLICATION

The present invention is related to the subject matter described in applicant's copending application Ser. No. 153,382 filed Feb. 8, 1988, for "Pin Jack With An Optical Element Holder".

BACKGROUND OF THE INVENTION

The present invention relates to a pin plug with an optical fiber which can be coupled with the mating jack by insertion thereinto for optical coupling therewith.

A conventional optical connection is also composed of a plug and a jack as is the case with an electric connector. However, since the plug and the jack of the optical connector considerably differ in shape from those of the electric connector, the optical connector cannot be employed for making the corrections of the electric connector nor can it be used in combination with the electric connector.

It is therefore an object of the present invention to provide a pin plug with an optical fiber which can be mechanically coupled with a conventional electric pin jack, for optical coupling therewith.

SUMMARY OF THE INVENTION

According to the present invention, a plug body has a cylindrical portion extending from the front thereof and a ferrule is disposed to extend through the cylindrical portion along its axis. The front end portion of the ferrule projects out of the cylindrical portion and the rear end portion is inserted in the plug body. The optical fiber exposed at the front end of an optical fiber cable is fitted in the front end of the ferrule and the rear end portion of the optical fiber cable is led out from the rear of the plug body.

In this instance, that portion of the ferrule projecting out of the plug body has the same size and shape as those of a contract of the so-called electric pin plug, and the cylindrical portion also has the same size and shape as those of a sleeve of the conventional electric pin plug. Therefore, the pin plug of the present invention can be mechanically coupled with the conventional electric pin jack. Accordingly, an optical connector can be formed with the same mechanical configuration and size as those in the prior art, by disposing a photodetector or light emitting element adjacent the tip of the pin plug inserted into the conventional electric pin jack.

BRIEF DESCRIPTION OF THE DRAWINGS

FIG. 3 is a sectional view illustrating another embodiment of the present invention; and FIG. 4 is an exploded perspective view, partly in section, of the embodiment shown in FIG. 3.

DESCRIPTION OF THE PREFERRED EMBODIMENTS

Figure 1:
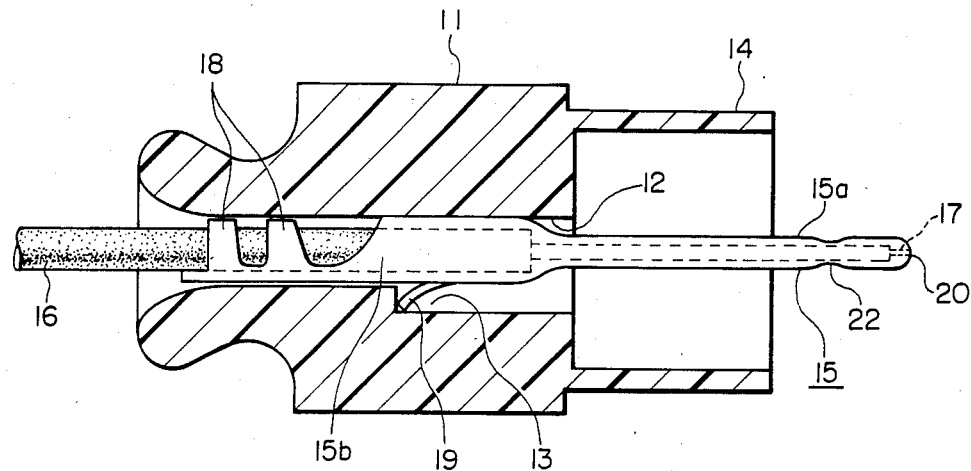
FIG. 1 is a sectional view illustrating an example of the pin plug with an optical fiber according to the present invention.

FIG. 1 schematically illustrates an example of the pin plug of the present invention. Reference numeral 11 indicates a plug body, which is, for example, a columnar molding of an insulating material. The plug body 11 has a through hole 12 extending along its axis and the through hole 12 has a recess 13.

The plug body 11 has a hollow cylindrical portion 14 integrally molded therewith on the front. The cylindrical portion 14 and the through hole 12 are axially aligned.

A ferrule 15 is disposed along the axis of the cylindrical portion 14, with the rear end portion of the ferrule pressed into and held in the plug body 11 and the front end portion projecting out of the cylindrical portion 14.

The ferrule 15 has housed therein an optical fiber cable 16. An optical fiber 17 of the optical fiber cable 16 is exposed at the front end thereof and fitted and positioned in a small through hole 20 formed in the tip of the ferrule 15. The inner diameter of the small through hole 20 in the tip of the ferrule 15 is selected small enough to snugly receive the optical fiber 17 of the optical fiber cable 16. That portion 15a of the ferrule 15 projecting out of the plug body 11 has housed therein the optical fiber cable 16 with its outer sheath removed; accordingly, the portion 15a has an inner diameter larger than that of the small through hole 20 and will hereinafter be referred to as a medium-diametered portion. That portion 15b of the ferrule 15 inserted in the plug body 11 has housed therein the optical fiber cable 16 with its outer sheath unremoved; accordingly, the portion 15b is larger in inner and outer diameter than the medium-diametered portion 15a and will hereinafter be referred to as a large-diametered portion. The rear end portion of the large-diametered portion 15b is formed as a cable clamper 18 for clamping the optical fiber cable 16 to fix it to the ferrule 15. The optical fiber cable 16 is led out of the rear end face of the plug body 11 for external connection.

Figure 2:
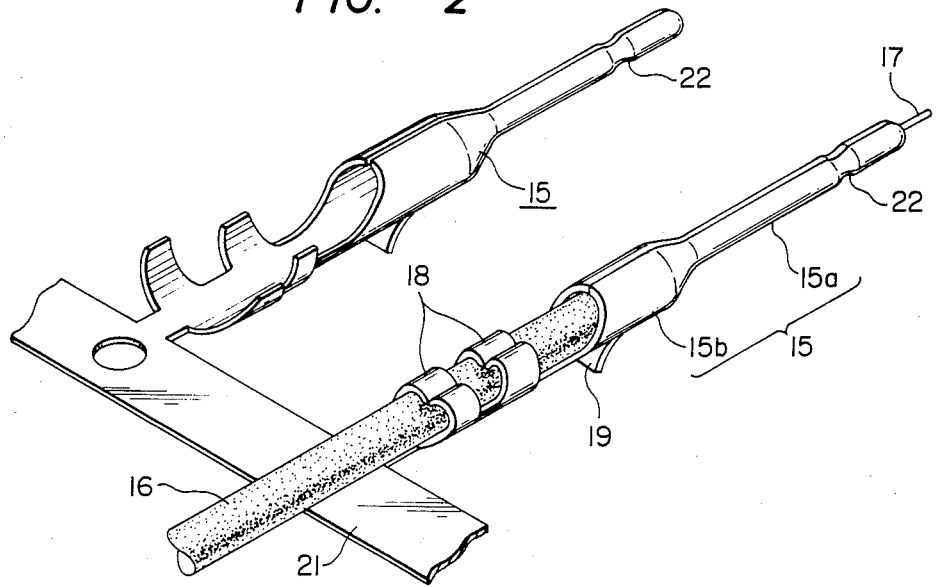
FIG. 2 is a perspective view showing a step in the manufacture of a ferrule used in the example of FIG. 1 and an example of the connection of an optical fiber cable to the ferrule.

The ferrule 15 has a pawl 19 extending out from the underside of the large-diametered portion 15b, and the pawl 19 is engaged in the recess 13 for preventing the ferrule 15 from slipping out of the through hole 12 of the plug body 11 after the ferrule has been pressed into the plug body 11 from behind. The ferrule 15 is fabricated by pressing sheet metal into a tubular form as shown in FIG. 2. In this case, a series of such ferrules 15 are produced and coupled together at the rear end through a carrier 21. The optical fiber cable 16 is inserted into each ferrule 15 and fixed thereto by the associated cable clamper 18, with the optical fiber 17 projecting out of the tip of the ferrule 15, and the projecting end of the optical fiber 17 is then cut off at the tip of the ferrule 15.

The cylindrical portion 14 of the plug body 11 has the same size and shape as those of a sleeve portion of an ordinary electric pin plug, and the medium-diametered projecting portion 15a of the ferrule 15 has the same size and shape as those of a pin contact of the ordinary pin plug. Accordingly, the ferrule 15 has a ring-shaped groove 22 made in the projecting portion 15a at a place close to the open end of the cylindrical portion 14 so that the projecting portion 15a is resiliently gripped by a contact piece of the mating pin jack.

FIGS. 3 and 4 illustrate another embodiment of the present invention, in which the parts corresponding to those in FIGS. 1 and 2 are identified by the same reference numerals. In this example, the optical fiber cable 16 is inserted intact into the projecting portion 15a of the ferrule 15 and the optical fiber 17 exposed at one end of the cable 16 is fitted in the small through hole 20 bored in the tip of the ferrule 15. The rear end portion of the ferrule 15 is made large-diametered, as indicated by 15b, and the large-diametered portion 15b has a tapped hole 24 sufficiently larger in diameter than the optical fiber cable 16. Reference numeral 23 designates a bush, the front end portion of which has a plurality of axial slits 25 and a male screw 23a for threaded engagement with the female screw of tappered hole 24. Either the tapped hole 24 of the ferrule 15 or the threaded portion 23a of the bush 23 tapers away. As the bush 23 is screwed into the ferrule 15 with the optical fiber cable 16 inserted therein, the threaded portion 23a of the bush 23 is urged against the cable 16, whereby the optical fiber cable 16 is fixed to the pin plug. After this, the large-diametered portion 15b of the ferrule 15 and the bush 23 thus threadably attached to each other are pressed into the cylindrical portion 14 integrally molded with the plug body 11. The rear end portion of the plug body 11 is extended along the optical fiber cable 16, forming a cable protecting portion.

The bush 23 and the plug body 11 may also be molded integrally. The ferrule 15 and the bush 23 can be made of either metal or plastics. It is also possible to make the diameters of each of the tapped hole 24 of the ferrule 15 and the threaded portion 23a of the bush substantially constant and select the diameter of the threaded portion 23a except its front end portion slightly larger than the diameter of the tapped hole 24.

As described above, the pin plug with an optical fiber according to the present invention can be used, as a pin plug of an optical connector, in combination with an electric pin jack-pin plug assembly without the necessity of modifying its mechanical arrangement and size.

It will be apparent that many modifications and variations may be effected without departing from the scope of the novel concepts of the present invention.

What is claimed is:

1. A pin plug with an optical fiber, comprising:
   a columnar plug body of a molded insulating material;
   a first through hole extending through said plug body along an axis thereof;
   a recess in an inner surface of said first through hole;
   a cylindrical portion integral with said plug body on the front side thereof in axial alignment with said first through hole;
   a ferrule having a large-diametered portion fixedly held in said first through hole, said ferrule having a projecting portion whose inner and outer diameters are smaller than those of said large-diametered portion, said projecting portion extending integrally from said large-diametered portion, axially and forwardly thereof, and projecting out of a front end of said cylindrical portion;
   a ring-shaped groove in the outer peripheral surface of said projecting portion adjacent the front end thereof;
   a second hole in the front end of said projecting portion;
   an optical fiber cable inserted through said plug body and fitted into said ferrule, an end portion of said optical fiber cable having its outer sheath removed and inserted into said projecting portion of said ferrule, a tip end portion of said optical fiber cable having its optical fiber exposed and fitted into said second through hole so that the extreme end of said exposed optical fiber is flush with the front end face of said projecting portion of said ferrule;
   a pawl extending rearwardly and outwardly integrally from said large-diametered portion of said ferrule in engagement with said recess in the inner surface of said first through hole; and
   a cable clamping portion at the rear end of said large-diametered portion of said ferrule for clamping said optical fiber cable;
   said ferrule, said pawl and said cable clamping portion being integral portions of a cut and bent sheet metal.

2. A pin plug with an optical fiber, comprising:
   a plug body made of an insulating material;
   a first through hole extending through said plug body;
   a cylindrical portion integral with said plug body on the front thereof in axial alignment with said first through hole;
   a bush disposed in said cylindrical portion and having a threaded front portion with a plurality of axial slits;
   a ferrule including a large-diametered portion having an outer diameter substantially equal to the inner diameter of said cylindrical portion and fixedly disposed in said cylindrical portion, said ferrule having a projecting portion whose inner and outer diameters are smaller than those of said large-diametered portion, said projecting portion projecting out of a front end of said cylindrical portion integrally from said large-diametered portion, said large-diametered portion having a tapped axial hole for engagement with said threaded front portion of said bush;
   a ring-shaped groove in the outer peripheral surface of said projecting portion at the front end portion thereof;
   a second through hole in a front end face of said projecting portion; and
   an optical fiber cable inserted through said plug body and said bush and fitted in said projecting portion of said ferrule, an end portion of said optical fiber cable having a tip end portion of its optical fiber exposed and fitted in said second through holes so that the extreme end of said exposed optical fiber is flush with the front end face of said projecting portion of said ferrule.

3. A pin plug with an optical fiber according to claim 2 wherein the rear end portion of said plug body extends rearwardly along said optical fiber cable to protect said cable.

* * * * *